Feb. 12, 1924.                                                    1,483,091
L. IMBLUM
STORAGE BATTERY CASING
Filed Dec. 23, 1921
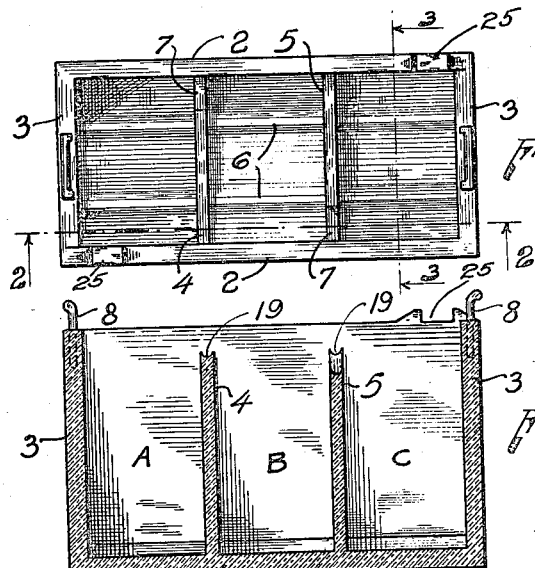
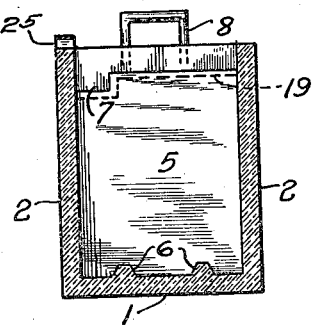
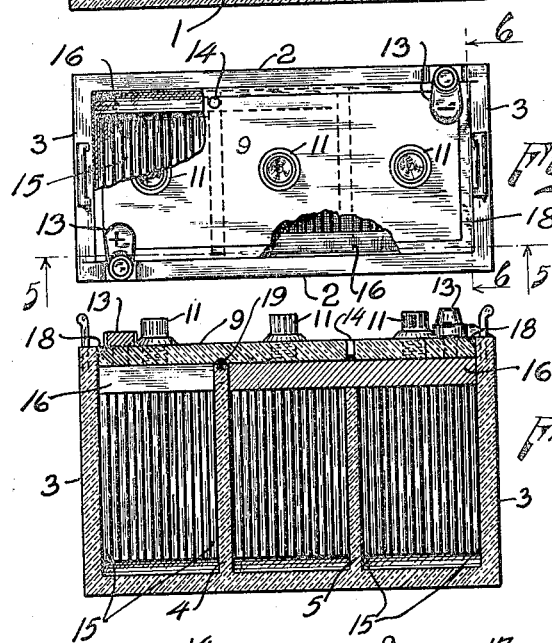
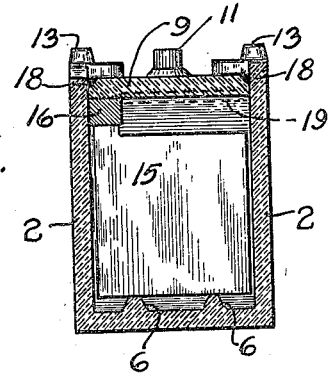
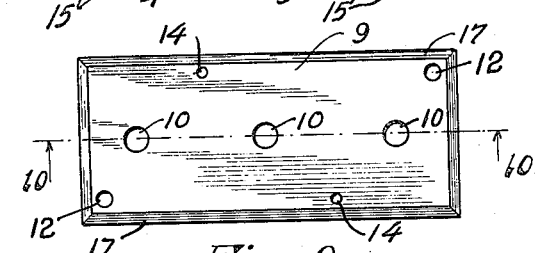
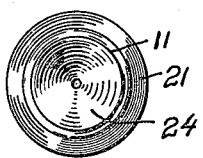
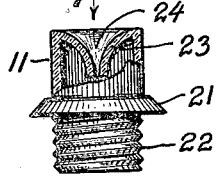
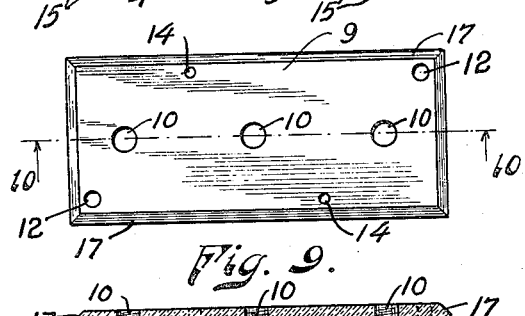
Inventor
Leo Imblum.
Attorney Patented Feb. 12, 1924.

1,483,091

UNITED STATES PATENT OFFICE.

LEO IMBLUM, OF PUEBLO, COLORADO.

STORAGE-BATTERY CASING.

Application filed December 23, 1921. Serial No. 524,430.

*To all whom it may concern:*

Be it known that I, LEO IMBLUM, a citizen of the United States, residing at the city and county of Pueblo and State of Colorado, have invented certain new and useful Improvements in Storage-Battery Casings; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to storage batteries, and has special reference to the cell construction.

It is the object of this invention to provide a multiple cell that is especially well adapted for automobile ignition and starting batteries, and which can be used for replacing cells for any make of storage battery.

It is a further object of this invention to provide a multiple compartment cell that can easily be made, and in which the battery elements can be readily assembled in such a manner as to produce a battery of simple and cheap construction and neat appearance and in which the connectors between the several battery elements of the cells will be enclosed within the cells and thus be concealed from view and protected from injury and possible short circuits.

In order to more clearly describe my invention, I shall have reference to the accompanying drawings, in which—

Fig. 1 is a top plan view of my battery cell;

Fig. 2 is a longitudinal section taken on line 2—2, Fig. 1;

Fig. 3 is a transverse section taken on line 3—3, Fig. 1;

Fig. 4 is a top plan view of my cell fully assembled;

Fig. 5 is a longitudinal section taken on line 5—5, Fig. 4;

Fig. 6 is a transverse section taken on line 6—6, Fig. 4;

Fig. 7 is a plan view of my ventilating plug;

Fig. 8 is a side elevation of my ventilating plug with parts broken away;

Fig. 9 is a plan view of the cover; and

Fig. 10 is a longitudinal section of the cover taken on line 10—10, Fig. 9.

The same reference numbers will be used to indicate the same parts throughout the several views. In Fig. 1 I have shown a rectangular box of suitable material, such as hard rubber, which can be moulded in a single piece; this box consists of a rectangular bottom member 1, having sides 2, and ends 3. The box is divided by transverse partitions 4 and 5 into three cells or compartments A, B and C. The bottom of each compartment is provided with two parallel ribs 6, which serve as a support for the battery plates, and also provides a free space for the accommodation of sediment. Partition walls 4 and 5 are each provided with a cut out portion or notch 7, for the reception of the connector which joins the several sets of battery elements into a series connection. The partition walls 4 and 5 are lower than the sides 2 and ends 3, so as to provide space for a cover. The ends 3 of the box may be provided with handles 8, if it is found desirable to do so.

In Fig. 4 I have shown a plan view of my battery fully assembled with parts broken away so as to show some of the inside connections. The cover 9 is made in one piece and is provided with holes 10 for the reception of vent plugs 11 and an opening 12 in each end for the reception of the terminal lugs 13, while holes 14 are provided whereby connection may be made to the two poles of each cell for the purpose of testing the voltage of each cell separately. The cells are each provided with the usual battery plates 15 which are alternately positive and negative; the plates of each polarity are connected together. The positive elements of one end cell are connected to a terminal lug 13 which projects through one of the holes 12 in the cover 9, and the negative elements of the other end cell are connected to another terminal lug 13 which projects through the other hole 12 in cover 9. The negative elements of the first named end cell and the positive elements of the last named end cell are joined by means of connector bars 16 with positive and negative elements, respectively, of the central cell. Bars 16 are, of course, covered with paint or other acid proof current-resisting material, and extend from one cell to the other through notches 7 in partitions 4 and 5, and are located below the cover. In this manner the battery top is made much neater in appearance, as only two terminal lugs are exposed thereon. By inserting a conductor through holes 14, contact can be made with bars 16 for the purpose of testing the voltage of each cell.

In order to seal the cover in place, I bevel the upper edges as indicated by 17 and pour sealing compound in the triangular channel thus formed between the cover and the sides of the box, as indicated by numeral 18. In order to seal the space between bar 16 and slot 7, and the cover 9 and the tops of the partition walls 4 and 5, the tops of the latter are provided with channels 19, which may be semi-circular in shape, and the lower surface of the cover is provided with semi-circular channels, which register with the channels 19 in the manner shown in Fig. 5. Sealing compound is then introduced into the channels between the cover and the partition walls. Suitable holes may be provided in the cover for the purpose of introducing the sealing compound.

In order to permit the escape of gas from the cells without permitting the electrolyte to escape, I have shown a ventilating plug 11 which I secure in holes 10 of the cover. This ventilating plug is shown in Figs. 7 and 8, and consists of a tubular member having a circular flange 21 intermediate its ends. The portion of the plug below the flange is preferably screw-threaded as indicated by 22. The upper end of the plug has a re-entrant portion 23 provided with a central opening 24. It is evident that gas may readily escape from my plug, but it is very difficult for liquids to escape therethrough, and if some electrolyte should escape, it will be received in the funnel-shaped top of the plug and will flow back into the cell.

From the above it will be seen that I have provided a multiple cell battery box or casing that can be moulded in a single piece, and which is so designed that the connection between the several cells may be made within the box and underneath the cover, whereby a battery of much neater appearance is produced. My battery is provided with a single cover for the several cells, and the one-piece box and single cover result in a much cheaper construction as well as a neater one. By providing the partition walls with notches 7, the plate straps or cell connectors can be used to connect the cells together, thus effecting a considerable saving in material. The one-piece box and cover also permit an easy means of securing the terminal extensions 13 in place by means of lugs 25, thereby aiding in keeping the cable terminals from corroding.

My unitary battery casing may be used for replacement purposes for any make of commercial storage battery, and when so used the unitary cover may be omitted and replaced by individual cell covers, likewise handles 8 may be omitted and the unitary battery casing placed in a container such as a wooden box or case with handles.

Having now described my invention, what I claim is—

1. A unitary battery casing comprising a box having a plurality of transverse partitions, each of which is provided with a notch near the side of the box, and a channel in the top of each partition for the reception of a sealing compound.

2. A unitary battery casing of acid resisting, non-absorptive material, comprising a plurality of cells separated by transverse partitions, said partitions having a notch in their upper corners whereby a connector may pass from one cell to the other, the tops of said partitions being lower than the sides of the casing whereby a space is provided for a cover, and parallel spaced supporting ribs on the bottom of each cell.

3. A battery casing comprising a box having a plurality of transverse partitions, each of which is provided with a notch in its upper surface for the reception of a connector, the partition members being lower than the sides of the box, whereby a space is provided for a cover, a cover in said space, said cover having an opening near each end for the reception of a terminal lug, a plurality of openings in said cover, adapted to receive vent plugs, and openings in said cover communicating with said connectors.

4. A battery casing comprising a box having a plurality of transverse partitions, each of which is provided with a notch in its upper surface for the reception of a connector, said partitions being lower than the sides of the box whereby space is provided for a cover, a pair of spaced lugs on the top edge of said case, and a connector from said terminal to said lug.

5. A unitary battery casing comprising a box having a plurality of transverse partitions by means of which it is divided into a number of cells, a unitary cover for said casing, and means for permitting electrical connectors to pass from one cell to the other underneath said cover.

6. A unitary battery casing comprising a box having a plurality of transverse partitions by means of which it is divided into a number of cells, a unitary cover for said casing, means for permitting electrical connections to pass from one cell to the other underneath the cover and means for permitting test connections to be made with said connectors.

7. A storage battery comprising a casing having a plurality of partitions forming cells, battery elements in said cells, a unitary cover for said casing and cells, and means beneath said cover for connecting the battery elements.

8. A storage battery comprising a casing having a plurality of partitions forming cells, battery elements in said cells, a unitary cover for said casing and cells, means beneath said cover for connecting the battery elements, and means for permitting test connections to be readily made with said connections.

In testimony whereof I affix my signature.

LEO IMBLUM.